INVENTOR.
William T. Curless
BY Carl A. Cline
AGENT

March 26, 1968     W. T. CURLESS     3,375,062
PROCESS FOR THE PREPARATION OF DIAMMONIUM PHOSPHATE
AND POTASSIUM NITRATE FROM POTASSIUM PHOSPHATE
AND AMMONIUM NITRATE
Filed Oct. 30, 1964     2 Sheets-Sheet 2

INVENTOR.
William T. Curless
BY Carl A. Cline
AGENT

United States Patent Office 3,375,062
Patented Mar. 26, 1968

3,375,062
PROCESS FOR THE PREPARATION OF DIAMMONIUM PHOSPHATE AND POTASSIUM NITRATE FROM POTASSIUM PHOSPHATE AND AMMONIUM NITRATE
William T. Curless, Overland Park, Kans., assignor to Gulf Oil Corporation, Pittsburgh, Pa., a corporation of Pennsylvania
Filed Oct. 30, 1964, Ser. No. 407,743
5 Claims. (Cl. 23—102)

ABSTRACT OF THE DISCLOSURE

By conducting phase reactions by changing concentrations or temperatures in a mixture of solid and aqueous solution phases consisting of aqueous solvent (water plus impurities) and the reciprocal salt pair;

Figure 1:
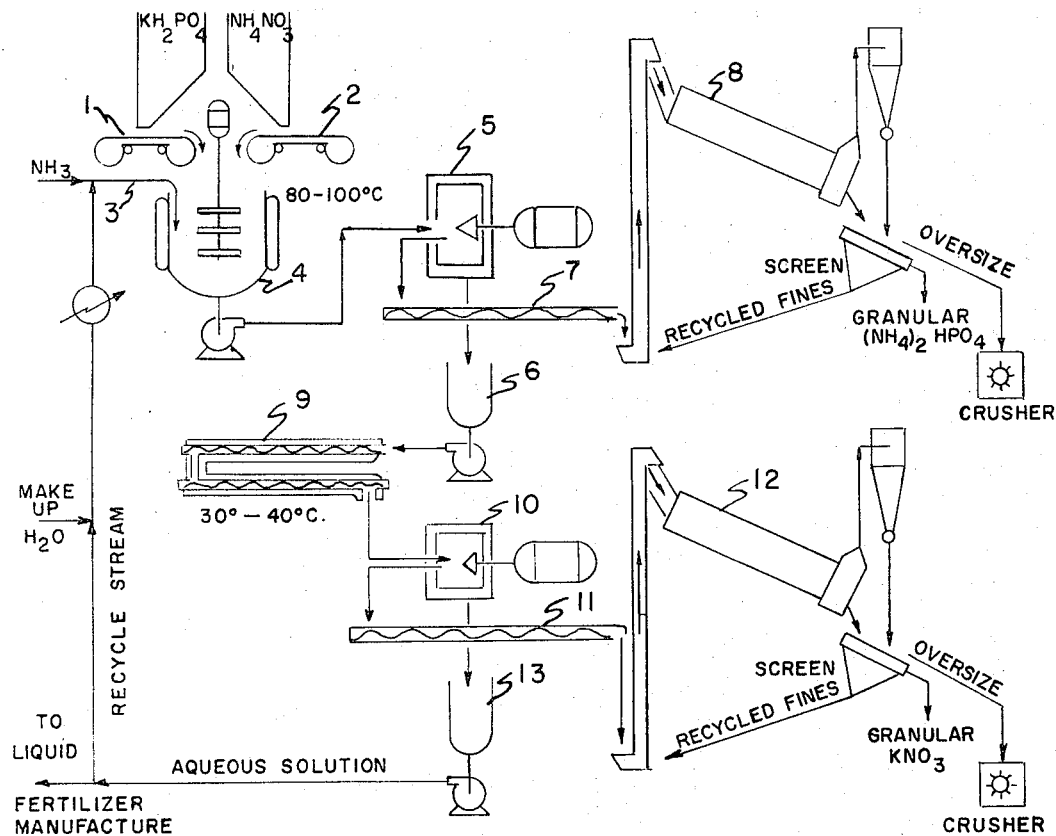

$$K_2HPO_4 + 2NH_4NO_3 \rightleftharpoons (NH_4)_2HPO_4 + 2KNO_3$$

there is obtained preferably at elevated temperatures $(NH_4)_2HPO_4$ as a single solid phase and on cooling, the mother liquor yields $KNO_3$, also as a single solid phase, both products being suitable for use in fertilizer formulations.

DESCRIPTION OF THE INVENTION

At present an impure grade of potassium chloride is the source of potassium in most commercial fertilizers. However, when fertilizer is utilized repeatedly at a high level, the chloride content of the soil builds up to a point at which it is detrimental to plant growth. This is especially true in coastal areas, in areas which require irrigation, and in areas which have alkaline soil. It also causes difficulty in greenhouse culture and when transplanting vegetables and ornamentals. Some plants are particularly susceptible to chloride phytotoxicity. One of these is tobacco for which growers now use chloride-free fertilizer obtained at premium prices. Potatoes are also of better quality when grown with fertilizer which is chloride and sulfur free.

Considerable effort has been expended to develop processes for manufacture of potassium salts of high fertilizer value which do not contain significant percentages of chlorides. The conversion of potassium chloride into various potassium phosphates is disclosed, for example, in the following patents: U.S. Patent 1,805,873, U.S. Patent 1,865,968, U.S. Patent 2,414,742, U.S. Patent 2,837,418, U.S. Patent 2,978,311, British Patent 832,011, British Patent 877,955, British Patent 878,739, German Patent 1,109,-716, German Patent 1,118,232.

Potassium metaphosphate made by reaction of potassium chloride with phosphoric acid is a polymeric substance, $(KPO_3)_n$, having very low solubility in water. However, this substance may be hydrolyzed by known methods to other potassium phosphates which are readily soluble and which are suitable sources of potassium and phosphorus fertilizer values. By mixing potassium phosphates with various commercially available nitrogenous substances such as ammonium nitrate, urea and the ammonium phosphates, a limited range of N-P-K fertilizer ratios can be achieved. However, many other desirable ratios cannot be achieved by blending potassium phosphates with these common sources of nitrogen. For example, a 1-4-4 fertilizer cannot be prepared from monopotassium orthophosphate, ammonium nitrate, and diammonium phosphate. It is thus very desirable to have available at low cost a potassium salt such as potassium nitrate, which can be used to obtain chloride free fertilizer mixtures of both high potassium and nitrogen content, while permitting relatively great variation in phosphorus content. Heretofore, potassium nitrate has been too expensive for use in ordinary fertilizer mixtures or has been made by methods which result in the production of gases such as NOCl which are highly corrosive and difficult to handle.

A novel method has now been invented for the manufacture of fertilizer products rich in potassium nitrate which is more economical than those previously in use. According to this invention, a mixture of potassium and ammonium phosphates and nitrates is reacted in an aqueous medium to yield solid potassium nitrate, solid diammonium phosphate and an aqueous solution which may be either recycled or used in the manufacture of liquid fertilizer. Briefly, in its broadest aspects the method consists of the following steps:

(a) Reacting at an elevated temperature a mixture of water and potassium and ammonium salts of phosphoric and nitric acids to produce a mixture containing a solid phase consisting essentially of ammonium phosphate and a liquid phase consisting of an aqueous solution;

(b) Recovering solid ammonium phosphate product from the mixture produced in step (a), obtaining an aqueous solution as a by-product;

(c) Converting the aqueous solution obtained in step (b) to a fertilizer product which is rich in potassium nitrate; and (d) Cooling the fertilizer product from step (c), if desired, to precipitate potassium nitrate which may then be separated and either recycling the liquid phase obtained by this separation to step (a) or using the liquid phase as a fertilizer product.

Figure 2:
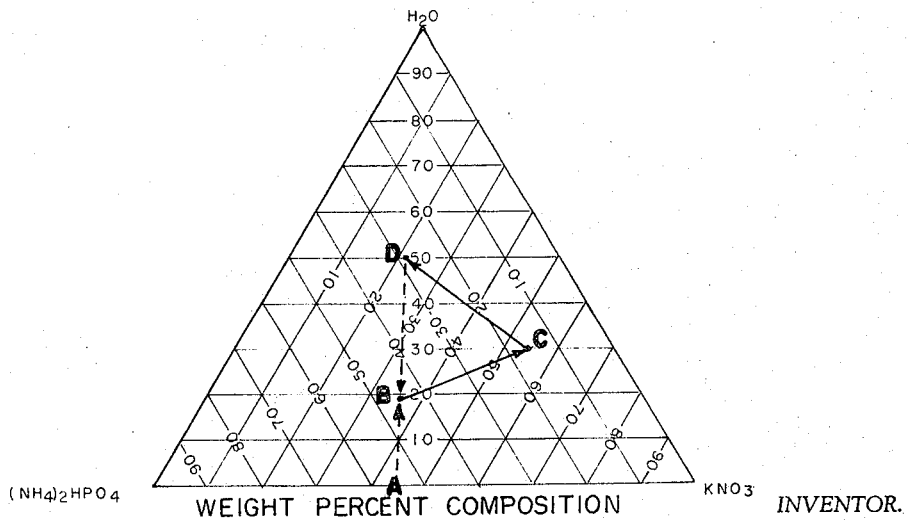
Figure 3:
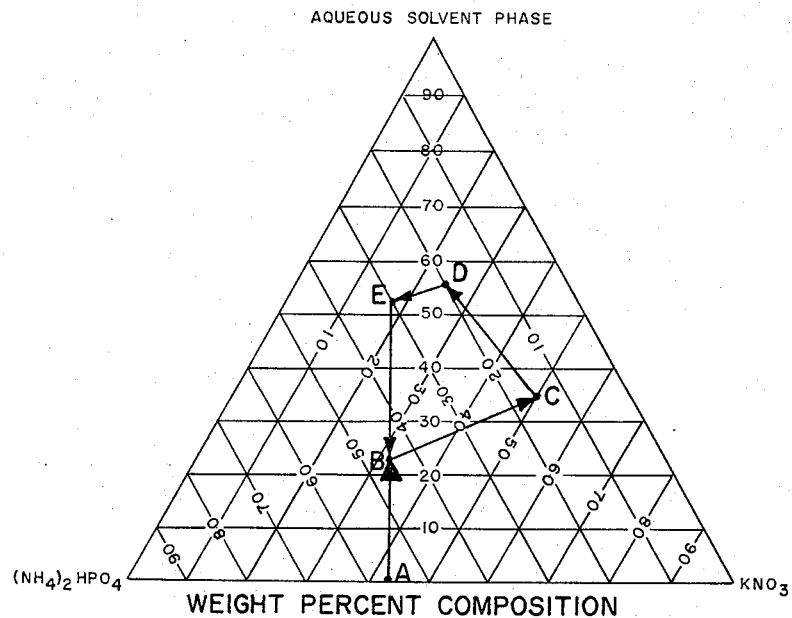
Figure 4:
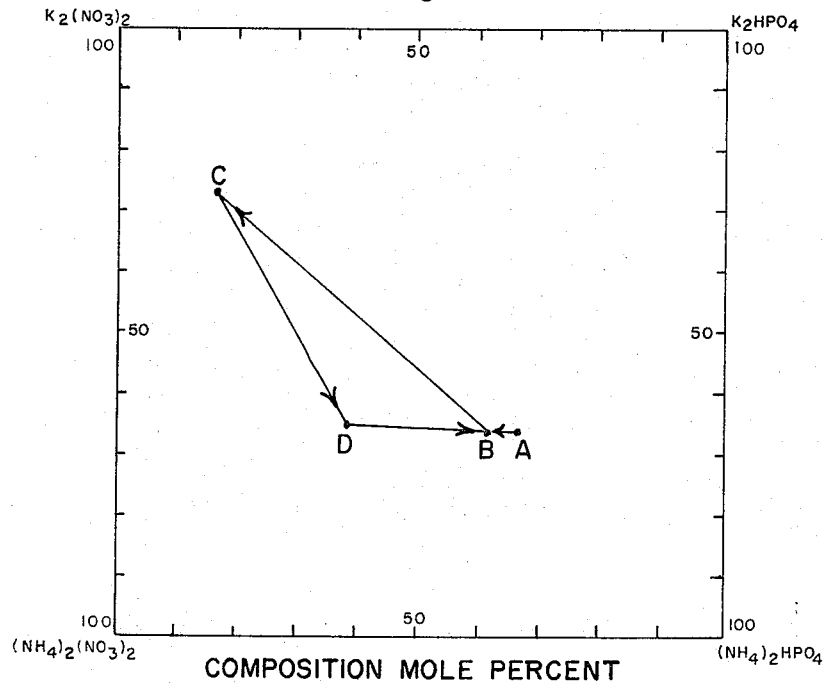

The method is described in greater detail below, with the aid of drawings and illustrative examples. FIGURE 1 is a flow diagram indicating in simplified form one type of apparatus, operating conditions, and process flow. FIGURE 2 is a triangular coordinate diagram of the system $(NH_4)_2HPO_4$—$KNO_3$—$H_2O$ showing the changes of composition of solid and liquid phases which occur during the operation of the process. FIGURE 3 is a triangular coordinate diagram illustrating changes in composition which occur in a specific embodiment of the process in which ammonia and phosphoric acid are added alternately. FIGURE 4 is a four-coordinate diagram of the Jänecke's projection type, representing the base of a pyramid on which points on vertical triangular sections such as FIGURES 2 and 3 are projected. FIGURE 4 illustrates changes in composition which occur in a specific embodiment in which an excess of ammonium nitrate is present in the reaction system. Jänecke's projections are discussed in various treatises on phase rule. For example, see "Aqueous Solution and the Phase Diagram" by F. F. Purdon and V. W. Slater (Edward Arnold & Co., 1946) pp. 93–130.

Step (a).—The reaction system which is dealt with in this process is extremely complex, having more individual components than can be included in a three-dimensional phase diagram. For purposes of illustration, one portion of the system is considered here. It consists of $$(NH_4)_2HPO_4, KNO_3$$

and aqueous solvent, which is essentially water, containing therein various soluble impurities. In actual practice, since certain impurities, principally sodium and chloride ions, will be present in the aqueous solvent, the yields of solid products will be displaced somewhat from the values shown on the graph of FIGURE 2. However, in order to simplify the discussion and illustrate the principle on which operation of the process is based, FIGURE 2 has been drawn to show the variation in composition of the system which occurs during operation of one embodiment of the process with pure chemicals.

Referring to FIGURE 1, illustrating a typical embodiment of the process, solid reactants are fed by weighing belts 1 and 2 and ammonia or other fluid reactant through inlet conduit 3, into the stirred, heated reaction vessel 4. The composition of the reaction mixture is adjusted so that it will produce the equivalent of a mixture of diammonium phosphate, potassium nitrate and water.

By way of illustration, by reference to FIGURE 2, the non-aqueous reactants at the beginning of step (a) may be present in such proportions as to be equivalent to the composition indicated by point A. Sufficient water is then employed in step (a) so that the composition of the initial reaction mixture is equivalent to that indicated by point B. When equilibrium is achieved at 100° C., which is a temperature conveniently maintained with waste or low pressure steam heat, the liquid phase in such a mixture has the composition indicated by point C. During the reaction, therefore, the aqueous phase will approach the composition indicated by point C and the undissolved phase will approach the composition of pure $(NH_4)_2HPO_4$.

As in all processes for manufacture of fertilizer components, economic considerations dictate the selection of preferred reactants and conditions. Depending on the type of manufacturing facilities located nearby, it may be advantageous to employ concentrated ammonium nitrate solution, or even nitric acid and ammonia (thereby making use of the heat of neutralization), rather than solid ammonium nitrate prills or grains, as illustrated. Alternatively, the ammonia may be dissolved in the concentrated ammonium nitrate solution or may even be added to solid ammonium nitrate to form a solution (Diver's solution) and this mixture used as the source of both ammonium nitrate and ammonia.

Preferably, monopotassium orthophosphate is obtained by hydrolysis of potassium metaphosphate, produced by reaction of fertilizer grade potassium chloride with phosphoric acid. The monopotassium phosphate is the primary source of various impurities which may appear in the reaction system. The presence of impurities may cause some shifting of point C, in which case a suitable adjustment of the composition of the reaction mixture represented by point B may be made if desired. This may be accomplished in several ways and is discussed later. The temperature of reaction may also be adjusted to relocate point C in a more advantageous position. By raising the temperature, the amount of aqueous solvent in the system may be reduced and a greater quantity of solid product may be obtained in step (a). This may not be feasible, however, because of the cost of fuel and heat exchange equipment and the difficulty and expense involved in handling thick slurries and in operation at superatmospheric pressure. In general, it is most economical to operate with inexpensive heat exchange apparatus and waste process steam, at temperatures between about 80° C. and 100° C. or with low pressure steam up to about 150° C.

As will be discussed later, the process also may be operated with the liquid phase enriched in ammonium nitrate or potassium phosphate. This has the advantage, when done under the proper conditions, of increasing the quantity of product obtained in step (a), and/or allowing greater flexibility in the fertilizer ratio produced if the liquid phase from step (c) or step (d) is used in the manufacture of fertilizer. If increased too much, excess ammonium nitrate or potassium phosphate in the liquid phase results in the production of potassium nitrate contaminated with diammonium phosphate unless extra water is added to the process. Also, if the process is operated so that the liquid phase contains an excess of either ammonium nitrate or potassium phosphate and a portion of the liquid phase is removed from the process for use in the manufacture of fertilizer products, the feed will of necessity contain an excess of ammonium nitrate or potassium phosphate.

*Step (b).*—Referring to FIGURE 1, the ammonium phosphate produced as solid phase in step (a) is conveniently separated from the aqueous phase by feeding the reaction mixture into centrifuge 5. The aqueous phase passes to holding vessel 6 and the wet solid ammonium phosphate is conveyed by screw conveyor 7 and by other means, if necessary, to a conventional granulator-dryer 8. Granulation may be carried out in the usual manner to yield a uniform granular product, with recovery and recycling of fines and crushing of oversized lumps.

Other methods of separation, such as drum filters, may be used in this step as long as a relatively constant temperature is maintained. However, if the separation is done rapidly, the maintenance of constant temperature does not become a serious problem. A shift in temperature during separation may cause contamination of the solid phase with other compounds. For this reason a very rapid separation method is preferred, with use of steam jackets and insulation wherever necessary to prevent temperature change.

*Step (c).*—Having carried out the initial reaction and separated the solid phase, the liquid phase is now at a constant composition at this reaction temperature. However, at a lower temperature such as 40° C., as shown in FIGURE 2, the most concentrated aqueous solution in such a system has the composition represented by point D. If the solution of composition represented by point C is chilled to 40° C., the composition of the liquid phase will change to that represented by point D and a solid phase consisting essentially of potassium nitrate will precipitate.

Referring to FIGURE 1, the liquid phase of composition C which is retained temporarily in holding vessel 6 is pumped to a cooled crystallizer 9, maintained at a lower temperature. The solution is cooled and maintained in the crystallizer at about 30° to 40° C., temperatures in this vicinity being easily obtained by use of surface water for cooling. If lower temperature cooling water is available, of course, the operating temperature may be lower, resulting in crystallization of a larger quantity of solid phase. Alternatively, the hot liquid may be pumped from holding vessel 6 and sprayed on dry solids in a fertilizer granulating process, as a source of moisture, to promote "balling up" and to provide chloride-free N-P-K fertilizer ingredients rich in potassium nitrate.

*Step (d).*—The mixture of solid and liquid phases produced in step (c) may conveniently be separated as indicated in FIGURE 1, by conducting the mixture from the crystallizer 9 to centrifuge 10. Wet, solid potassium nitrate is conveyed from the centrifuge by screw conveyor 11 and by other means, if necessary, to a granulator-dryer 12, where dry granular potassium nitrate is produced.

The aqueous solution is conducted from centrifuge 10 to holding vessel 13. This aqueous solution, having a composition as indicated by point D in FIGURE 2 may be utilized in various ways. Being rather rich in fertilizer salts, it may be utilized in preparation of liquid fertilizer products. By adding non-aqueous reagents the system can also be returned to the composition represented by point B of FIGURE 2, the entire aqueous phase of composition D being recycled, if desired. Since recycling builds up the concentration of impurities in the system, however, unlimited recycling is not normally advisable.

The method of manufacturing fertilizer products disclosed herein consists of relatively simple steps. The heterogeneous systems dealt with, however, are extremely complex, consisting essentially of water and the following ions: $K^+$, $NH_4^+$, $H^+$, $HPO_4^=$, $H_2PO_4^-$, $PO_4^{\equiv}$ and $NO_3^-$. These ions can precipitate from solutions in many different combinations, as simple salts, hydrates, double salts and mixtures thereof. The compositions indicated by points C and D on the diagram of FIGURE 2 are only those which are obtained at the two operating temperatures indicated. For other temperatures, the locations of points C and D will vary and may be determined. In a preferred method of operation, points C and D are directly in line with the 100% $KNO_3$ vertex of the triangular diagram. Under this condition, potassium nitrate relatively free from precipitated diammonium phosphate may be obtained without the necessity of adding and removing excess water from the process. In certain other cases, which may be represented as multidimensional models or two or three dimensional projections, when addition and elimination of water is necessary, this may be the preferred method of operation for economic reasons if, for example, the feed is to consist of one of the commercially available liquid forms of ammonium nitrate, such as 83% or 90% ammonium nitrate liquor.

For the sake of convenience, water plus dissolved impurities may be considered as a single component, in place of water in the simplified composition diagram of FIGURE 2. Soluble impurities which are carried into the system may cause some shifting of points C and D, so that these points will have to be determined experimentally for a specific practical situation and plotted on a triangular chart. If it is found that C and D are no longer in line with the potassium nitrate apex, some diammonium phosphate may be precipitated with the potassium nitrate. If this is objectionable, however, corrective measures are possible. For example, if point C is found to have shifted to the left, addition of an appropriate quantity of water after the recovery of the diammonium phosphate product will compensate for this difference, making possible the recovery of potassium nitrate of satisfactory purity. If point C has shifted to the right, it is possible to remedy the situation by increasing the recycle liquid-to-feed ratio in those modifications in which the liquid phase from the potassium nitrate removal step is returned to the process for re-use.

In those modifications of the process in which the liquid phase from the potassium nitrate step is returned to the process for re-use, one corrective measure is of particular interest. In this method the water which is added to the process to allow preparation of a purer product, although it may be removed from the process by evaporation, is removed along with its solute from the process as a liquid product. This has the advantage of removing a portion of the impurities within the process and thus decreasing the shift in point C while allowing production of a liquid product for use in fertilizer manufacture. Addition of the water in such a process may advantageously be in the form of 83% or 90% ammonium liquor, which is available commercially.

If points C and D shift significantly toward either right or left, they can also be readjusted if desired by small additions of either phosphoric acid or ammonia. The proper quantities may be easily determined experimentally. It may also be advantageous with respect to the relative positions of points C and D to operate with some excess of either ammonium nitrate or potassium phosphate in the liquid phase in one or more steps of the process. The precise effect of such modifications may be determined experimentally for a particular combination of raw materials and concentration of various impurities.

FIGURE 3 is a triangular coordinate diagram illustrating changes in composition of the system which occur during the operation of a specific embodiment of the process of the invention, as described in Example 17. Designation of points is the same as FIGURE 2 except that point C, representing the composition of the liquid phase after the removal of solid product at 86° C. contains ammonia in excess of two moles of ammonia per mole of phosphate and the shift from point D to point E is obtained by the addition of phosphoric acid, resulting in a liquid phase containing less than two moles of ammonia per mole of phosphate.

FIGURE 2 represents a section cut through a three-dimensional phase diagram constructed in the shape of a square pyramid. To illustrate behavior of a mixture containing an excess of ammonium nitrate, for example, it would be necessary to represent the diagram in a different manner. One method of demonstration is shown in FIGURE 4. FIGURE 4 is a "Jänecke's projection" of one embodiment of this invention as described in Example 14 in which the mixture contains an excess of ammonium nitrate. Designation of points is the same as FIGURE 2 and the process the same as previously discussed except that the liquid phase will contain ammonium nitrate as well as diammonium phosphate and potassium nitrate and the temperature range of the cycle is 40° C. to 100° C. As with the previously described embodiment, other temperatures may be used to decrease the recycle load. Again, the addition and elimination of water may be desirable in some cases to enhance purity of the solid products, as may the adjustment of ammonium and phosphate ion concentrations with ammonia and phosphoric acid.

It is, of course, possible to operate the process to recover not only diammonium phosphate and potassium nitrate, but also various double salts, solid solutions and mixtures containing these substances, some of which would be interesting fertilizer products. It will be understood that to obtain variation in product composition, drastic modification of the process may be required. To make possible a choice of process steps and conditions, it will be necessary to obtain data and plot areas within the multi-dimensional phase diagram at locations not illustrated herein.

So that the operation of the process may be more fully understood, the following specific examples are presented by way of illustration, it being understood that possible variations and modifications not specifically disclosed may be made by those skilled in the art without departing from the spirit and scope of the invention. If other modifications are desired, a three-dimensional phase diagram can be plotted from the data in the examples and the desired ratios of products and reactants can be selected by consulting the diagram.

All quantities in the examples are parts by weight, unless otherwise specified.

*Example I*

This example illustrates a modification of the process in which the feed consists of essentially equal molar amounts of $KH_2PO_4$, $NH_4NO_3$, and $NH_3$, with recycling of substantially all of the liquid from the potassium nitrate separation step.

Feed to the process consisting of 13.5 parts monopotassium phosphate, 7.95 parts ammonium nitrate, and 1.7 parts ammonia was mixed with recycle liquor of composition 5.72 parts diammonium phosphate, 4.59 parts potassium nitrate, and 10.54 parts water. The temperature of the mixture was maintained at 86° C. for 30 minutes, after which the solid, consisting of 13.1 parts of diammonium phosphate was centrifuged from the slurry, leaving a liquid consisting of 5.72 parts diammonium phosphate, 14.59 parts potassium nitrate, and 10.54 parts water. The liquid was cooled to 40° C., causing precipitation of 10.0 parts potassium nitrate which was centrifuged from the slurry, leaving a liquid consisting of 5.72 parts diammonium phosphate, 4.59 parts potassium nitrate, and 10.54 parts water, which was recycled to be mixed with more feed.

*Example II*

This illustration is of a modification in which solid diammonium phosphate and a liquid fertilizer rich in potassium nitrate are the products.

Feed to the process consisting of 13.5 parts monopotassium phosphate, 9.6 parts 83% ammonium nitrate liquor, 1.7 parts ammonia, and 5.6 parts water was mixed for 30 minutes at 86° C. The slurry was filtered to remove 9.2 parts diammonium phosphate, leaving a liquid of composition 3.9 parts diammonium phosphate, 10.1 parts potassium nitrate, and 7.2 parts water; which, when diluted with additional water, yielded a stable liquid fertilizer product.

*Example III*

This modification of the invention illustrates the preparation of solid diammonium phosphate, potassium nitrate, and a liquid enriched in potassium nitrate.

13.5 parts monopotassium phosphate, 9.6 parts 83% ammonium nitrate liquor, and 1.7 parts ammonia were mixed at 86° C. with recycle liquor from the process containing 4.33 parts diammonium phosphate, 3.46 parts potassium nitrate, and 8.17 parts water. After 30 minutes of mixing, the slurry was centrifuged giving 12.3 parts of diammonium phosphate and a liquid enriched in potassium nitrate, 17% of which was removed from the process as a liquid product. This portion contained 0.88 part diammonium phosphate, 2.25 parts potassium nitrate, and 1.63 parts water. The remaining 83% of the liquid was cooled to 40° C., causing precipitation of 7.74 parts potassium nitrate, which was removed from the slurry by centrifuging. The filtrate from the centrifuge consisted of 4.33 parts diammonium phosphate, 3.46 parts potassium nitrate, and 8.17 parts of water, which was recycled to be mixed with more incoming feed.

*Example IV*

This example illustrates a modification of the process in which solid diammonium phosphate, solid potassium nitrate, and a liquid fertilizer are produced.

In a stirred, steam-jacketed, reaction vessel 13.5 parts monopotassium phosphate, 9.6 parts 83% ammonium nitrate liquor, 1.7 parts ammonia, and 5.6 parts water were mixed together for 30 minutes at 90° C. The solid phase, consisting of 9.2 parts diammonium phosphate, was removed from the process by centrifugation, and the filtrate was cooled to 40° C. to precipitate 7.0 parts potassium nitrate. The solid potassium nitrate was removed from the system by centrifugation, leaving a liquid consisting of 3.9 parts diammonium phosphate, 3.1 parts potassium nitrate, and 7.2 parts water as a liquid fertilizer product.

*Example V*

This example illustrates a modification of the invention in which solid diammonium phosphate, solid potassium nitrate, and a liquid fertilizer are produced.

Feed to the process consisting of 13.5 parts monopotassium phosphate, 9.6 parts 83% ammonium nitrate liquor, and 1.7 parts ammonia was mixed for 30 minutes at 86° C. with 4.3 parts diammonium phosphate, 3.4 parts potassium nitrate, and 8.2 parts water recycled from the process. The solid phase, consisting of 12.3 parts diammonium phosphate, was centrifuged from the slurry, leaving a liquid which was cooled to 40° C., precipitating 9.3 parts potassium nitrate. The solid potassium nitrate was centrifuged from the slurry, leaving a liquid which was divided into two parts. One portion of the liquid, consisting of 17% of the total was removed from the process as a liquid product. It consisted of 0.9 part diammonium phosphate, 0.7 part potassium nitrate, and 1.6 parts water. The remaining 83% of the liquid, consisting of 4.3 parts diammonium phosphate, 3.5 parts potassium nitrate, and 8.2 parts water, was recycled to be mixed with more feed for processing.

*Example VI*

This illustration of the invention shows the preparation of diammonium phosphate, potassium nitrate and two liquid products without recycle.

A reaction mixture consisting of 18.0 parts monopotassium phosphate, 12.7 parts 83% ammonium nitrate liquor, 2.25 parts ammonia, and 7.5 parts water was mixed at 86° C. for 30 minutes. The resulting slurry was centrifuged to yield 12.3 parts diammonium phosphate, and a liquid. The liquid was split; one portion containing 0.88 part diammonium phosphate, 2.3 parts potassium nitrate, and 1.63 parts water was removed from the process for use in manufacture of a liquid fertilizer product. The remainder of the liquid was cooled to 40° C. to precipitate 7.74 parts potassium nitrate which was removed by centrifuging, leaving a liquid fertilizer product containing 4.3 parts diammonium phosphate, 3.5 parts potassium nitrate, and 8.2 parts water.

*Example VII*

This example illustrates a cyclic modification of the invention in which diammonium phosphate, potassium nitrate and two liquid products are prepared.

Feed to the process consisting of 13.5 parts monopotassium phosphate, 9.6 parts 83% ammonium nitrate liquor and 1.7 parts ammonia was mixed for 30 minutes at 86° C. with recycle liquor from the process consisting of 4.3 parts diammonium phosphate, 3.5 parts potassium nitrate and 8.2 parts water. The slurry was centrifuged to remove 12.3 parts of diammonium phosphate leaving a liquid which was split into two portions. One portion consisting of 0.44 part diammonium phosphate, 1.13 parts potassium nitrate and 0.81 part water was removed from the process as a liquid product while still hot. The hot liquid was suitable for introduction into a fertilizer granulating process as a source of moisture and chloride free potash. The other portion was cooled to 40° C., precipitating 8.6 parts potassium nitrate which was centrifuged from the process, leaving a liquid which was split into two portions. One portion consisting of 0.44 part diammonium phosphate, 0.35 part potassium nitrate, and 0.82 part water was removed from the process as a liquid product. The other portion was recycled for processing with more feed.

*Example VIII*

This example illustrates a modification of the process in which the feed contains as the potassium ingredient the double compound $KH_2PO_4 \cdot H_3PO_4$.

Feed to the process consisting of 23.20 parts

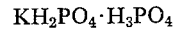

$$KH_2PO_4 \cdot H_3PO_4$$

7.95 parts ammonium nitrate, and 5.0 parts ammonia was mixed for 30 minutes at 86° C. with a liquid from the process containing 5.72 parts diammonium phosphate, 4.59 parts potassium nitrate, and 10.54 parts water. After 30 minutes, the slurry which contained 26.5 parts solid diammonium phosphate was centrifuged to remove the solid as a product. The filtrate from the centrifuge was cooled to 40° C., precipitating 10.0 parts potassium nitrate which was removed by centrifugation. The centrifuge filtrate contained 5.72 parts diammonium phosphate, 4.59 parts potassium nitrate, and 10.54 parts water and was recycled for mixing with the incoming feed.

*Example IX*

This example illustrates a modification of the process similar to that shown in Example 1 except the temperature range is increased by 14° C., causing a decrease in the recycle liquor load of about 33%.

Feed to the process consisted of 13.5 parts monopotassium phosphate, 7.95 parts ammonium nitrate, and 1.7 parts ammonia was mixed at 100° C. for 30 minutes with 3.8 parts diammonium phosphate, 3.0 parts potassium nitrate, and 7.0 parts water recycled from the process. 13.1 parts diammonium phosphate, formed as the solid phase in the mixture was separated from the process by centrifuging. The filtrate was cooled to 40° C., precipitating 10.0 parts potassium nitrate which was centrifuged leaving a liquid consisting of 3.8 parts diammonium phosphate, 3.0 parts potassium nitrate, and 7.0 parts water which was recycled for mixing with incoming feed.

*Example X*

This example illustrates a modification of the process similar to that of Example 2 except that the temperature range is increased by 14° C.

A reaction mixture consisting of 17.4 parts monopotassium phosphate, 12.4 parts 83% ammonium nitrate liquor, 2.2 parts ammonia, and 4.9 parts water was stirred for 30 minutes at 100° C. The slurry which resulted was separated into two products by centrifugation, a solid phase consisting of 13.1 parts diammonium phosphate and a liquid phase consisting of 3.8 parts diammonium phosphate, 13.0 parts potassium nitrate, and 7.0 parts water. Upon dilution of the liquid phase with water, a liquid fertilizer product was obtained which remained stable in storage.

Example XI

This example illustrates a modification of the process in which the feed consists of essentially equimolar amounts of $KH_2PO_4$, $NH_4NO_3$, and $NH_3$ with recycling of substantially all of the liquid from the potassium nitrate separation step and with an excess of ammonium nitrate in the recycle liquor.

Feed to the process consisting of 35.6 parts monopotassium phosphate, 20.9 parts ammonium nitrate, and 4.4 parts ammonia was mixed with recycle liquor of composition 3.2 parts diammonium phosphate, 18.6 parts potassium nitrate, 27.8 parts ammonium nitrate, and 29.7 parts water. Water (4.9 parts) was removed by evaporation. The temperature of the remaining mixture was maintained at 86° C. for 30 minutes, after which the solid, consisting of 34.5 parts diammonium phosphate, was centrifuged from the slurry, leaving a liquid consisting of 3.2 parts diammonium phosphate, 44.5 parts potassium nitrate, 27.8 parts ammonium nitrate, and 24.8 parts water. Then 4.9 parts of water was added to the liquid and it was cooled to 40° C., causing precipitation of 26.4 parts of potassium nitrate which was centrifuged from the slurry, leaving a liquid consisting of 3.2 parts diammonium phosphate, 18.6 parts potassium nitrate, 27.8 parts ammonium nitrate, and 29.7 parts water, which was returned to the process to be mixed with more feed.

Example XII

This example illustrates a modification of the process in which the feed consists of essentially equimolar amounts of $KH_2PO_4$, $NH_4NO_3$ and $NH_3$ with recycling of substantially all of the liquid from the potassium nitrate separation step and with an excess of potassium phosphate in the recycle liquor.

Feed to the process consisting of 31.3 parts of monopotassium phosphate, 18.5 parts ammonium nitrate, and 3.9 parts of ammonia was mixed with recycle liquor of composition 22.0 parts diammonium phosphate, 7.9 parts potassium nitrate, 11.3 parts dipotassium phosphate, and 37.7 parts water. Then 2.9 parts of water were removed by evaporation. The temperature of the remaining mixture was maintained at 86° C. for 30 minutes, after which the solid, consisting of 30.4 parts of diammonium phosphate, was centrifuged from the slurry, leaving a liquid consisting of 22.0 parts diammonium phosphate, 31.5 parts potassium nitrate, 11.3 parts dipotassium phosphate, and 34.8 parts water. Then 2.9 parts of water were added to the liquid and it was cooled to 40° C., causing precipitation of 23.2 parts of potassium nitrate, which was centrifuged from the slurry, leaving a liquid consisting of 22.0 parts diammonium phosphate, 7.9 parts potassium nitrate, 11.3 parts dipotassium orthophosphate, and 37.7 parts water which was returned to the process to be mixed with more feed.

Example XIII

This example illustrates a modification of the process in which an impurity, sodium chloride, was present in both the liquid phase returned for re-use and in the feed. The example also illustrates the use of water added to the process in the form of 83% ammonium nitrate liquor and removed from the process in a liquid product as a means of controlling the amount of impurity in the liquid phase of the process.

Monopotassium phosphate (526 parts), sodium chloride (3.6 parts), and a mixture of 67 parts ammonia, 312 parts ammonium nitrate and 63.4 parts water were added to the liquid phase from the process consisting of 183.6 parts diammonium phosphate, 120 parts potassium nitrate, 19.6 parts sodium chloride, and 330.3 parts water. The mixture was agitated for 30 minutes at 86° C. The solid phase, consisting of 478.2 parts diammonium phosphate and 16.1 parts potassium nitrate, was centrifuged from the slurry and the filtrate cooled to 40° C. The solid phase which formed consisted of 292.2 parts potassium nitrate and 28 parts diammonium phosphate. The solid phase was centrifuged from the slurry and the liquid phase returned to the process for re-use. It was the third time the liquid phase had been recycled. The liquid phase consisted of 151 parts diammonium phosphate, 115 parts potassium nitrate, 17.8 parts sodium chloride, and 286.2 parts water. Handling losses accounted for the remainder of the material, including that portion to be used as a liquid product. Composition of the liquid phase was well controlled, indicating that the change in composition was well within experimental limits, with the sodium chloride content varying only 0.1% from the concentration of the original liquid phase prior to recycling.

Example XIV

This example illustrates a modification of the process operated between 100° C. and 40° C. in which the feed consists of essentially equimolar amounts of $KH_2PO_4$, $NH_4NO_3$ and $NH_3$ with recycling of substantially all of the liquid from the potassium nitrate separation step and with an excess of ammonium nitrate in the recycle liquor.

Feed to the process consisting of 61.0 parts monopotassium phosphate, 35.9 parts ammonium nitrate, and 7.6 parts ammonia was mixed with recycle liquor of composition 8.2 parts diammonium phosphate, 11.8 parts potassium nitrate, 6.7 parts ammonium nitrate, and 26.0 parts water. The temperature of the mixture was maintained at 100° C. for 20 minutes with agitation, after which the solid, consisting of 59.2 parts diammonium phosphate, was centrifuged from the slurry, leaving a liquid consisting of 8.2 parts diammonium phosphate, 57.5 parts potassium nitrate, 6.7 parts ammonium nitrate, and 26 parts water. The liquid was cooled to 40° C., causing precipitation of 45.4 parts potassium nitrate which was centrifuged from the slurry leaving a liquid consisting of 8.2 parts diammonium phosphhate, 11.8 parts potassium nitrate, 6.7 parts ammonium nitrate, and 26 parts water, which was recycled to be mixed with more feed.

Example XV

This example illustrates a modification of the process in which the feed consists of essentially equimolar amounts of $KH_2PO_4$, $NH_4NO_3$ and $NH_3$ with recycling of substantially all of the liquid from the potassium nitrate separation step and with $NH_4H_2PO_4$ in the recycle liquor.

Feed to the process consisting of 41 parts monopotassium phosphate, 24.2 parts ammonium nitrate, and 5.1 parts ammonia was mixed with recycle liquor composed of 11.4 parts potassium nitrate, 19.3 parts diammonium phosphate, 7.1 parts monoammonium phosphate, and 31.6 parts water. The temperature of the mixture was maintained at 86° C. for 30 minutes with agitation, after which the solid, consisting of 39.8 parts diammonium phosphate, was centrifuged from the slurry, leaving a liquid consisting of 41.8 parts potassium nitrate, 19.3 parts diammonium phosphate, 7.1 parts monoammonium phosphate, and 31.6 parts water. The filtrate was cooled to 40° C. causing the precipitation of 30.4 g. of potassium nitrate which was centrifuged from the slurry, leaving a liquid consisting of 11.4 parts potassium nitrate, 19.3 parts diammonium phosphate, 7.1 parts monoammonium phosphate, and 31.6 parts water, which was recycled to be mixed with more feed.

Example XVI

This example illustrates a modification of the process in which the feed consists of essentially equimolar amounts of monopotassium orthophosphate, ammonium nitrate, and ammonia, with recycling of substantially all of the liquid from the potassium nitrate separation step, and with triammonium phosphate in the recycle liquor.

Feed to the process consisting of 31.2 parts monopotassium orthophosphate, 18.3 parts ammonium nitrate, and 3.9 parts ammonia was mixed with recycle liquor composed of 26.4 parts potassium nitrate, 15.7 parts diammonium phosphate, 4.0 parts triammonium phosphate, and 54.2 parts water. Water (20.7 parts) was removed by evaporation. Temperature of the remaining mixture was maintained at 86° C. for 30 minutes with agitation, after which the solid, consisting of 30.3 parts of diammonium phosphate, was centrifuged from the slurry, leaving a liquid consisting of 49.6 parts potassium nitrate, 15.7 parts diammonium phosphate, 4.0 parts triammonium phosphate, 33.5 parts water. 20.7 parts of water were added to the liquid and it was cooled to 40° C., causing precipitation of 23.2 parts potassium nitrate, which was centrifuged from the slurry, leaving a liquid consisting of 26.4 parts potassium nitrate, 15.7 parts diammonium phosphate, 4.0 parts triammonium phosphate, and 54.2 parts water, which was recycled to be mixed with more feed.

*Example XVII*

This example illustrates a modification of the process in which the feed consists of essentially equimolar amounts of $KH_2PO_4$ and $NH_4NO_3$ but with a ratio of approximately 1.1 moles of ammonia per mole of $KH_2PO_4$ and $NH_4NO_3$. Substantially all of the liquid from the potassium nitrate separation step is recycled and an adjustment of the liquid phase composition is made using phosphoric acid after the diammonium phosphate removal step so as to allow preparation of a purer product without the necessity of addition and evaporation of water.

Feed to the process consisting of 48.5 parts monopotassium phosphate, 28.6 parts ammonium nitrate, and 6.5 parts ammonia was mixed with recycle liquor composed of 13.5 parts potassium nitrate, 19.4 parts diammonium phosphate, 2.6 parts monoammonium phosphate, and 33.5 parts water. The temperature of the mixture was maintained at 86° C. for 30 minutes with agitation, after which the solid, consisting of 47.7 parts diammonium phosphate, was centrifuged from the slurry, leaving a liquid consisting of 49.6 parts potassium nitrate, 15.9 parts diammonium phosphate, 3.7 parts triammonium phosphate, and 33.5 parts water. Then 1.5 parts of 75% phosphoric acid were added to the liquid and it was cooled to 40° C., causing precipitation of 36.1 parts potassium nitrate which was centrifuged from the slurry, leaving a liquid consisting of about 13.5 parts potassium nitrate, 19.4 parts diammonium phosphate, 2.6 parts monoammonium phosphate, and 33.5 parts water, which was recycled to be mixed with more feed. Handling losses accounted for removal from the system of the small amount of water added with the 75% phosphoric acid.

*Example XVIII*

This example illustrates a modification of the process in which the feed consists of essentially equimolar amounts of $KH_2PO_4$, $NH_4NO_3$ and $NH_3$ with recycling of substantially all of the liquid from the potassium nitrate separation step and with an excess of ammonium nitrate in the recycle liquor.

Feed to the process consisting of 48.4 parts monopotassium phosphate, 28.5 parts ammonium nitrate and 6.1 parts ammonia was mixed with recycle liquor from the process consisting of 14.7 parts diammonium phosphate, 13.8 parts potassium nitrate, 2.6 parts ammonium nitrate and 32.4 parts water. After agitation at 86° C. for 20 minutes the solid phase was removed by centrifuging. It consisted of 46.9 parts diammonium phosphate. The liquid phase consisting of 14.7 parts diammonium phosphate, 50.1 parts potassium nitrate, 2.6 parts ammonium nitrate and 32.4 parts water was cooled to 40° C. causing the formation of a solid phase consisting of 36.3 parts potassium nitrate. The solid product was removed by centrifuging and the liquid phase, consisting of 14.7 parts diammonium phosphate, 13.8 parts potassium nitrate, 2.6 parts ammonium nitrate and 32.4 parts water, was returned to the process for re-use.

*Example XIX*

This example illustrates a modification of the process which is run using ammonia and phosphoric acid to aid in the removal of solid diammonium phosphate and potassium nitrate products.

Feed to the process consisting of 15.9 parts monopotassium phosphate, 9.4 parts ammonium nitrate, 3.8 parts ammonia and 18.1 parts water was mixed with recycle liquor of composition 14.5 parts potassium nitrate, 20.9 parts diammonium phosphate, 4.2 parts monoammonium phosphate and 35.8 parts water. After agitation at 86° C. for 30 minutes, the solid phase consisting of 15.6 parts diammonium phosphate was removed from the system by centrifuging leaving a liquid phase of composition 26.3 parts potassium nitrate, 10.1 parts diammonium phosphate, 10.5 parts triammonium phosphate and 53.9 parts water. Then 8.7 parts 75% phosphoric acid was added to the liquid and 20.3 parts water removed by evaporation. After cooling to 40° C., a solid phase consisting of 11.8 parts potassium nitrate precipitated and was removed from the system by centrifuging, leaving a liquid phase composed of 14.5 parts potassium nitrate, 20.9 parts diammonium phosphate, 4.2 parts monoammonium phosphate and 35.8 parts water to be returned to the process for re-use.

*Example XX*

This example illustrates the operation of the process with a total feed of essentially equimolar parts of monopotassium orthophosphate, ammonium nitrate and ammonia, but with introduction of the feed subsequent to the first step.

(a) A recycle liquor consisting of 27.8 parts of diammonium phosphate, 21.7 parts potassium nitrate and 50.5 parts of water was held at 100° C. until 38.7 parts of water was evaporated, resulting in the precipitation of diammonium phosphate.

(b) The diammonium phosphate (21.5 parts) which precipitated was recovered by centrifuging, leaving a liquid phase consisting of 6.3 parts diammonium phosphate, 21.7 parts potassium nitrate and 11.8 parts water.

(c) The liquid phase obtained in step (b) was mixed with 22.2 parts of monopotassium orthophosphate, 13.0 parts of ammonium nitrate, 2.8 parts of ammonia and 38.7 parts of water. The mixture was agitated at 40° C. for 30 minutes, yielding a solid phase consisting of potassium nitrate.

(d) The product mixture from step (c) was separated by centrifuging, yielding 16.5 parts of solid potassium nitrate and a liquid phase consisting of 27.8 parts diammonium phosphate, 21.7 parts potassium nitrate and 50.5 parts of water.

(e) The liquid phase obtained in step (d) was recycled to step (a).

*Example XXI*

This example illustrates the production of potassium nitrate and diammonium phosphate by an isothermal process.

(a) A recycled solution consisting of 19.2 parts potassium nitrate, 27.7 parts diammonium phosphate, 5.6 parts monoammonium phosphate and 47.5 parts water are held at 40° C. in an evaporating apparatus until 8.3 parts of water had been removed. Then 1.66 parts of ammonia were added, with thorough mixing, resulting in precipitation of diammonium phosphate.

(b) The reaction product of step (a) was separated by centrifuging, yielding 20.5 parts of diammonium phosphate and a liquid phase consisting of 19.2 parts potassium nitrate, 6.7 parts diammonium phosphate, 7.5 parts triammonium phosphate and 39.2 parts of water.

(c) To the liquid phase obtained in step (b) was added 14.4 parts monopotassium orthophosphate, 8.5 parts ammonium nitrate, 1.8 parts ammonia and 17.1 parts of 55 percent phosphoric acid. After mixing for 30 minutes at 40° C., a slurry was obtained consisting of solid potassium nitrate and a liquid phase.

(d) The slurry obtained in step (c) was separated by centrifuging to yield 10.7 parts of solid potassium nitrate and a liquid phase consisting of 19.2 parts potassium nitrate, 27.7 parts diammonium phosphate, 5.6 parts monoammonium phosphate and 47.5 parts water.

(e) The liquid phase obtained in step (d) was then recycled to step (a).

*Example XXII*

This example illustrates the manufacture of solid potassium nitrate and diammonium phosphate by a process in which ammonium nitrate is always present in substantial quantities in the liquid phase.

(a) A recycled liquid phase consisting of 2.5 parts diammonium phosphate, 22.0 parts potassium nitrate, 6.7 parts ammonium nitrate and 45.5 parts of water was heated at 86° C. in an evaporating apparatus until 32.9 parts of water had evaporated and solid diammonium phosphate had precipitated.

(b) The reaction product of step (a) was separated by centrifuging, yielding 18.0 parts of diammonium phosphate and a liquid phase consisting of 2.5 parts diammonium phosphate, 22.0 parts potassium nitrate, 6.7 parts ammonium nitrate and 12.6 parts water.

(c) To the liquid phase obtained in step (b) was added 18.6 parts monopotassium orthophosphate, 2.3 parts ammonia, 10.9 parts ammonium nitrate and 32.9 parts water. The mixture was agitated for 45 minutes at 40° C., during which time solid potassium nitrate precipitated from solution, yielding a slurry as a reaction product.

(d) The slurry reaction product of step (c) was separated by centrifuging, yielding 13.8 parts of solid potassium nitrate and a liquid phase consisting of 2.5 parts diammonium phosphate, 22.0 parts potassium nitrate, 6.7 parts ammonium nitrate and 45.5 parts water.

(e) The liquid phase obtained in step (d) was recycled to step (a).

*Example XIII*

This example illustrates the manufacture of solid potassium nitrate and diammonium phosphate by means of a procedure in which substantial quantities of dipotassium phosphate are present in the liquid phase.

(a) A recycled liquid phase consisting of 28.0 parts diammonium phosphate, 9.0 parts potassium nitrate, 14.4 parts dipotassium phosphate and 49.0 parts water was heated at 86° C. in an evaporating apparatus until 29.2 parts of water were removed and a solid phase consisting of diammonium phosphate had formed in addition to the liquid phase.

(b) The reaction mixture obtained in step (a) was separated by centrifuging, yielding 13.1 parts of solid diammonium phosphate and a liquid phase consisting of 14.9 parts diammonium phosphate, 9.0 parts potassium nitrate, 14.4 parts dipotassium phosphate and 19.8 parts water.

(c) The liquid phase obtained in step (b) was mixed with 13.5 parts monopotassium orthophosphate, 1.7 parts ammonia, 8.0 parts ammonium nitrate and 29.2 parts water. This mixture was maintained at 40° C. for 30 minutes with stirring, during which time a solid phase consisting of potassium nitrate formed a slurry with the liquid phase.

(d) The slurry produced in step (c) was separated by centrifuging to yield 10.2 parts of solid potassium nitrate and a liquid phase consisting of 28.0 parts diammonium phosphate, 9.0 parts potassium nitrate, 14.4 parts dipotassium phosphate and 49.0 parts water.

(e) The liquid phase obtained in step (d) was recycled to step (a).

*Example XXIV*

This example illustrates the manufacture of solid potassium nitrate and diammonium phosphate while maintaining a substantial concentration of ammonium nitrate in the liquid phase.

(a) A recycled liquid phase consisting of 5.4 parts diammonium phosphate, 23.4 parts potassium nitrate, 30.5 parts ammonium nitrate and 40.4 parts water was heated at 86° C. in an evaporating apparatus until 30.3 parts of water had been removed, yielding a slurry consisting of solid diammonium phosphate and a liquid phase.

(b) The slurry product obtained in step (a) was separated by centrifuging to yield 3.9 parts of solid diammonium phosphate and a liquid phase consisting of 1.5 parts diammonium phosphate, 23.4 parts potassium nitrate, 30.5 parts ammonium nitrate and 10.1 parts water.

(c) The liquid phase obtained in step (b) was mixed with 3.8 parts monopotassium orthophosphate, 0.5 part ammonia, 2.2 parts ammonium nitrate and 30.3 parts water. This mixture was agitated at 40° C. for 30 minutes, yielding a slurry consisting of solid potassium nitrate and a liquid phase.

(d) The slurry obtained as the product of step (c) was separated by centrifuging to yield 2.9 parts of solid potassium nitrate and a liquid phase consisting of 5.4 parts diammonium phosphate, 23.4 parts potassium nitrate, 30.5 parts ammonium nitrate and 40.4 parts water.

(e) The liquid phase obtained in step (d) was then recycled to step (a).

The above examples which include an evaporation step are particularly suited to the operation of the process in areas in which the climate is hot and dry. In such areas outdoor evaporators can be operated very economically. An isothermal process, such as is illustrated in Example XXI is particularly advantageous in an area in which fuel is expensive.

It is possible to operate only a portion of the method of this invention, if this is desirable. For instance, a slurry product mixture or a saturated aqueous solution which is obtained in a particular step may be prepared from suitable raw materials as the first step, and the process continued from that point. The following example illustrates this type of procedure.

*Example XXV*

Feed to the process consisting of 36.9 parts of monopotassium orthophosphate, 26.2 parts of 83 percent aqueous ammonium nitrate, 2.5 parts of ammonia and 23.0 parts of water was held at 40° C. for 20 minutes with agitation. A slurry was obtained which consisted of solid potassium nitrate and a liquid phase consisting of an aqueous solution. By centrifugal filtration, 18.2 parts of solid potassium nitrate was separated, leaving an aqueous solution consisting of 14.6 parts monoammonium orthophosphate, 19.3 parts diammonium phosphate, 9.2 parts potassium nitrate and 27.4 parts water. The solution was diluted with additional water to yield a liquid fertilizer composition which was stable in storage in outdoor tanks.

The first step in the above example consists of the preparation of a substantially saturated solution of potassium nitrate and diammonium phosphate equivalent to one normally obtained by filtering off solid diammonium phosphate. At a lower temperature, the reaction mixture yields directly a slurry of solid potassium nitrate in a saturated aqueous solution, and the production of solid diammonium phosphate is avoided. This modification is particularly suited to small plants serving a limited area, so that liquid fertilizer need not be transported for long distances. The potassium nitrate may be stored, shipped, or sold locally, either alone or in mixed fertilizer compositions. The diammonium phosphate would, in effect, be marketed in aqueous solution.

This combination of products is particularly desirable in certain areas in which annual rainfall is about thirty inches or less.

What is claimed is:

1. A process for manufacturing diammonium orthophosphate comprising the steps:
   (a) Reacting at an elevated temperature up to about 150° C. a mixture of solid and aqueous phases consisting essentially of water, ammonia, ammonium nitrate and monopotassium orthophosphate, adjusting the composition of the reaction mixture to yield a solid phase consisting of substantially pure diammonium orthophosphate and an aqueous solution phase consisting essentially of water, diammonium orthophosphate and potassium nitrate, and
   (b) Recovering diammonium orthophosphate as a solid product by separating the solid phase from the aqueous solution phase produced in step (a).

2. A process for manufacturing potassium nitrate comprising the steps:
   (a) Cooling from an elevated temperature below about 150° C. an aqueous solution phase consisting essentially of water, diammonium orthophosphate and potassium nitrate to a temperature sufficiently low so as to yield a solid phase consisting essentially of potassium nitrate and an aqueous solution phase which is saturated with potassium nitrate and contains a substantial quantity of diammonium orthophosphate, and
   (b) Recovering potassium nitrate as a solid product by separating the solid phase from the aqueous solution phase produced in step (a).

3. A process comprising the steps:
   (a) Reacting ammonia at constant temperature with an aqueous solution phase containing substantial amounts of both monoammonium orthophosphate and potassium nitrate to yield a solid phase consisting essentially of diammonium orthophosphate and an aqueous solution phase which is saturated with respect to diammonium phosphate and contains substantial amounts of diammonium orthophosphate, triammonium orthophosphate and potassium nitrate, and
   (b) Recovering diammonium orthophosphate as a solid product by separating the solid phase from the aqueous solution phase produced in step (a).

4. A process comprising the steps:
   (a) Reacting at constant temperature a solution which contains substantial amounts of diammonium orthophosphate, potassium nitrate and triammonium orthophosphate with sufficient monopotassium orthophosphate, ammonium nitrate, ammonia and phosphoric acid to yield a solid phase consisting essentially of potassium nitrate and an aqueous solution phase which is saturated with respect to potassium nitrate and contains a substantial amount of monoammonium orthophosphate, and
   (b) Recovering potassium nitrate as a solid product by separating the solid phase from the aqueous solution phase produced in step (a).

5. A process comprising the steps:
   (a) Reacting at a temperature within the range of about 80° C. to 100° C. a mixture of solid and liquid phases consisting essentially of monopotassium orthophosphate, ammonia and ammonium nitrate, controlling the proportions of reactants so as to produce a mixture containing a solid phase consisting essentially of diammonium orthophosphate and an aqueous solution phase consisting essentially of water, diammonium phosphate and potassium nitrate;
   (b) Recovering a solid product consisting essentially of diammonium phosphate by separating the mixture produced in step (a), obtaining an aqueous solution phase as a by-product;
   (c) Reducing the temperature of the aqueous solution phase obtained in step (b) to about 30° C. to 40° C. to yield a mixture of a solid phase consisting essentially of potassium nitrate and an aqueous liquid solution phase; and
   (d) Separating the mixture produced in step (c) to yield a solid product consisting essentially of potassium nitrate and an aqueous solution phase consisting essentially of water, diammonium phosphate and potassium nitrate.

References Cited

UNITED STATES PATENTS

| | | | |
|---|---|---|---|
| 2,024,370 | 12/1935 | Kaseltiz | 23—102 |
| 2,157,260 | 5/1939 | Dessevre et al. | 23—102 |

DONALL H. SYLVESTER, *Primary Examiner.*

R. BAJEFSKY, *Assistant Examiner.*